United States Patent
Rachakonda (10) Patent No.: US 9,612,866 B2
(45) Date of Patent: Apr. 4, 2017

(54) SYSTEM AND METHOD FOR DETERMINING A RECOMMENDATION ON SUBMITTING A WORK REQUEST BASED ON WORK REQUEST TYPE

(75) Inventor: Suman Rachakonda, Andhra Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 556 days.

(21) Appl. No.: 13/597,497

(22) Filed: Aug. 29, 2012

(65) Prior Publication Data

US 2014/0068617 A1    Mar. 6, 2014

(51) Int. Cl.
    *G06F 9/46*    (2006.01)
    *G06F 9/48*    (2006.01)

(52) U.S. Cl.
    CPC .................. *G06F 9/4843* (2013.01)

(58) Field of Classification Search
    CPC ...... G06F 9/505; G06F 9/5055; G06F 9/5038; G06F 9/50; G06F 11/3433
    See application file for complete search history.

(56) References Cited

U.S. PATENT DOCUMENTS

| | | | |
|---|---|---|---|
| 5,870,557 A * | 2/1999 | Bellovin et al. | 709/224 |
| 5,878,224 A * | 3/1999 | Smith | 709/224 |
| 6,088,737 A * | 7/2000 | Yano et al. | 709/235 |
| 7,114,158 B1 * | 9/2006 | Thompson et al. | 718/106 |
| 7,210,143 B2 | 4/2007 | Or et al. | |
| 7,240,325 B2 | 7/2007 | Keller | |
| 7,926,051 B2 | 4/2011 | Barta et al. | |
| 8,082,318 B2 * | 12/2011 | Hosking et al. | 709/217 |
| 8,290,627 B2 | 10/2012 | Richards et al. | |
| 8,312,127 B2 | 11/2012 | Nedelcu et al. | |
| 8,365,183 B2 * | 1/2013 | Esfahany et al. | 718/104 |

(Continued)

FOREIGN PATENT DOCUMENTS

| | | |
|---|---|---|
| EP | 1577765 | 9/2005 |
| WO | 2004010292 | 1/2004 |
| WO | 2007076946 | 7/2007 |

OTHER PUBLICATIONS

SAS(R) 9.2 Intelligence Platform: Installation and Configuration Guide, <http://support.sas.com/documentation/cdl/en/biig/60946/PDF/default/biig.pdf> retrieved Dec. 26, 2012, 4 pages.

(Continued)

*Primary Examiner* — Wissam Rashid
(74) *Attorney, Agent, or Firm* — Tucker Ellis LLP (57) ABSTRACT

Described herein are systems and methods for receiving a recommendation before submitting a work request. As described herein, an indication of a work request, a recommendation request and a set of application server properties are received at a recommendation engine. The recommendation engine processes the recommendation request, and based on the set of application server properties, determines a recommendation on whether to submit the work request and/or whether to schedule the work request for a later time. Thereafter, the recommendation engine generates a recommendation notification that indicates whether to submit/schedule the work request to provide for a proactive approach to submitting the work request.

17 Claims, 4 Drawing Sheets

(56) References Cited

U.S. PATENT DOCUMENTS

| | | | |
|---|---|---|---|
| 8,559,036 B1* | 10/2013 | Khafizova | 358/1.15 |
| 2002/0157020 A1 | 10/2002 | Royer | |
| 2003/0187969 A1* | 10/2003 | Wilcock | 709/223 |
| 2005/0080801 A1 | 4/2005 | Kothandaraman et al. | |
| 2005/0198200 A1* | 9/2005 | Subramanian et al. | 709/218 |
| 2006/0059568 A1* | 3/2006 | Smith-Mickelson et al. | 726/27 |
| 2006/0080413 A1 | 4/2006 | Oprea et al. | |
| 2007/0136788 A1 | 6/2007 | Monahan et al. | |
| 2007/0260702 A1 | 11/2007 | Richardson et al. | |
| 2008/0098099 A1 | 4/2008 | Khasnis et al. | |
| 2008/0256531 A1 | 10/2008 | Gao et al. | |
| 2010/0058331 A1 | 3/2010 | Berg et al. | |
| 2012/0005646 A1 | 1/2012 | Manglik et al. | |
| 2013/0227127 A1* | 8/2013 | Takano et al. | 709/224 |
| 2013/0346993 A1* | 12/2013 | Chen | G06F 9/5072 718/103 |

OTHER PUBLICATIONS

Deployment Plan, <http://msdn.microsoft.com/en-us/library/ff649036.aspx> retrieved Dec. 26, 2012, 6 pages.

Coupaye, T. et al., Foundations of Enterprise Software Deployment, http://equipes-lig.imag.fr/adele/Les.Publications/intConferences/CSMR2000Est.pdf, Oct. 1999, 9 pages.

Automated Provisioning for Applications in the Cloud, VMware vFabric Application Director: Provisioning & Management, http://www.vmware.com/products/application-platform/vfabric-application-director/overview.html, retrieved Dec. 26, 2012, 2 pages.

VMware vFabric Application Director, Provision and Scale High-Performing Applications Faster in the Cloud, A Riverbed and VMware Joint Partner Brief, Aug. 21, 2012, http://www.riverbed.com/vmware/assets/PartnerSolutionBrief-Riverbed_Stingray_vFabric_App_Dir.pdf, 4 pages.

Amazon Virtual Private Cloud FAQs, Amazon Web Services, http://aws.amazon.com/vpc/faqs/, retrieved Dec. 26, 2012, 13 pages.

Securing the Microsoft Platform on Amazon Web Services, Amazon Web Services, Aug. 2012, http://d36cz9buwrultt.cloudfront.net/AWS_Microsoft_Platform_Security.pdf, 22 pages, Tom Stickle.

Dell Kace—Software Deployment Tools and Automated Solutions, Enterprise Software Deployment Appliances and Tools—Dell KACE™, http://www.kace.com/solutions/business-needs/systems-deployment, retrieved Dec. 24, 2012, 3 pages.

Pistoia, M. et al., Enterprise Java Security, Building Secure J2EE Applications, 2004, http://flylib.com/books/en/4.289.1.56/1/, retrieved Dec. 26, 2012, 4 pages.

* cited by examiner

Figure 4

SYSTEM AND METHOD FOR DETERMINING A RECOMMENDATION ON SUBMITTING A WORK REQUEST BASED ON WORK REQUEST TYPE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and application servers, and are particularly related to systems and methods for submitting batch job requests for use in a middleware machine or other environments.

BACKGROUND

In a traditional system, batch job requests can be executed immediately or can be scheduled to execute at a later time. These jobs typically share common resources such as hardware, software and data. System overload, resource contention, and/or deadlock situations are major reasons for batch jobs to fail.

One method used to prevent batch jobs from failing is to have a system limit (e.g., a workers' queue limit) on the number of batch jobs handled by the system. However, the system limit does not take into account that system overload, resource contention, and/or deadlock situations can occur before the system limit is reached. When either of these situations occurs, the system cannot prevent users from submitting new jobs. As a result, the state of the system is made worse when users, unaware of the current state of the system, continue to submit new jobs. Thereafter, an administrator has to take appropriate action to restore the system.

These are the areas that embodiments of the invention are intended to address.

SUMMARY

Described herein are systems and methods of embodiments of the invention for receiving a recommendation before submitting a work request. As described herein, an indication of a work request, a recommendation request and a set of application server properties are received at a recommendation engine. The recommendation engine processes the recommendation request, and based on the set of application server properties, determines a recommendation on whether to submit the work request, and/or whether to schedule the work request for a later time. Thereafter, the recommendation engine generates a recommendation notification that indicates whether to submit/schedule the work request.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described above, when a system is in an undesirable state, the system cannot prevent a user from submitting requests (e.g., batch jobs). At best, the system can accept new requests and hold them in a wait state to later process if/when the system recovers, and if the system fails to recover, the system simply fails/aborts/hangs these requests. Thus, under the traditional approach, there is no way to proactively handle the unfavorable system conditions.

However, in accordance with an embodiment of the invention, when the system goes into such a state and a user attempts to submit a work request, the system can provide a recommendation to the user to either schedule the work request at a later time or refrain from submitting the work request until the system recovers. Providing this recommendation to a user at the time the user attempts to submit a work request helps to ensure that the system does not deteriorate further if the user follows the recommendation. This is because the system can stop further load by providing appropriate advice to the user, can use resources to cater to the already submitted jobs, and can take corrective measures to get back on track. In an embodiment, the recommendation can be provided to the user on demand, that is to say that a recommendation is provided only when requested. In an alternative embodiment, a recommendation can be provided each time a work request is submitted.

Figure 1:
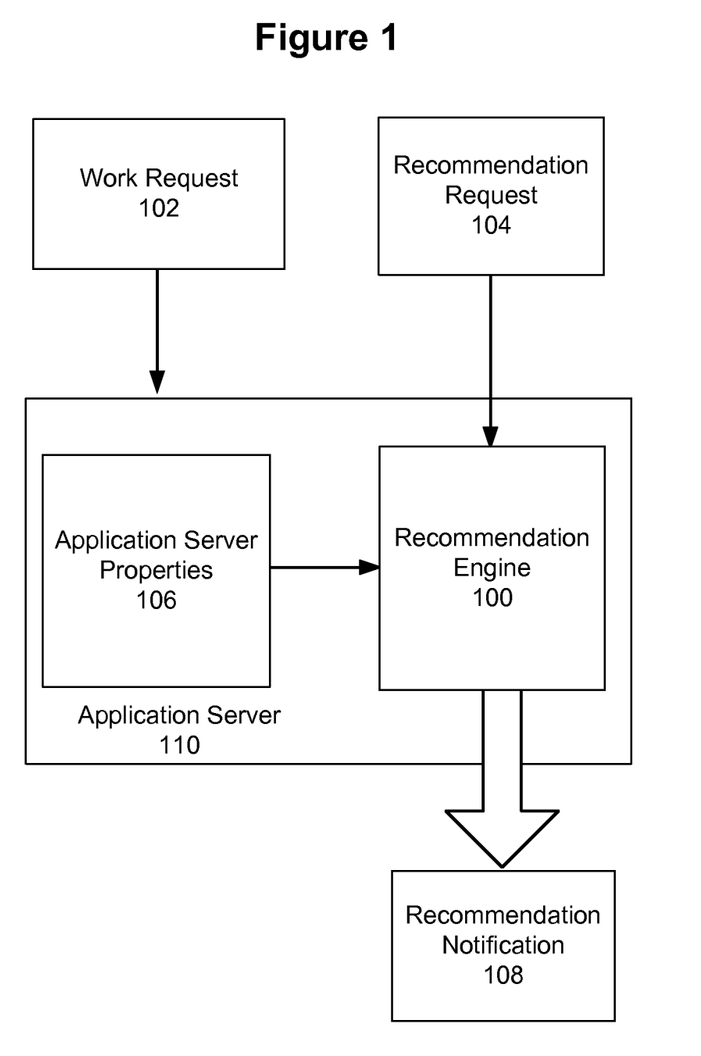
FIG. 1 shows an exemplary system for receiving advice before submitting a batch job for use in an application server or other environment, in accordance with an embodiment of the invention.

FIG. 1 shows an exemplary system for providing advice before submitting a batch job for use in an application server or other environment, in accordance with an embodiment of the invention. As shown in FIG. 1, an application server 110 receives inputs including a work request 102 (e.g., a request to submit a batch job or any other request for work), and a recommendation request 104. In the event that application server 110 receives a recommendation request 104 associated with a work request 102, the recommendation request 102 and work request 104 are provided to recommendation engine 100 along with a set of application server properties 106. The output of the recommendation engine 100 is a recommendation notification 108 that indicates whether to submit the work request 102. For example, the recommendation engine 100 processes the recommendation request 104, and based on the set of application server properties 106 and/or other factors, generates a recommendation on whether to submit the work request 102. However, if no recommendation request 104 is received, application server 110 can execute the work request 102 without providing a recommendation notification 108.

Application server properties 106 include information about the general performance of the application server, and any available resource contentions. The application server properties 106 can include, for example: the number of users waiting for a particular resource, database table, database object or other application server provided resource; the number and/or state of work requests that are similar to the submitted work request; the load on the database or other loads on the application server; resource contentions in or associated with the application server; and deadlocks in the database or deadlocks associated with the application server. The application server properties 106 can include one or more metric indicative of the general performance of the application server and/or contentions/deadlocks. A metric can be based on a combination of one or more of the above described factors, or based on any one of the factors such as the number of work requests similar to a work request type of the submitted work request.

Figure 2:
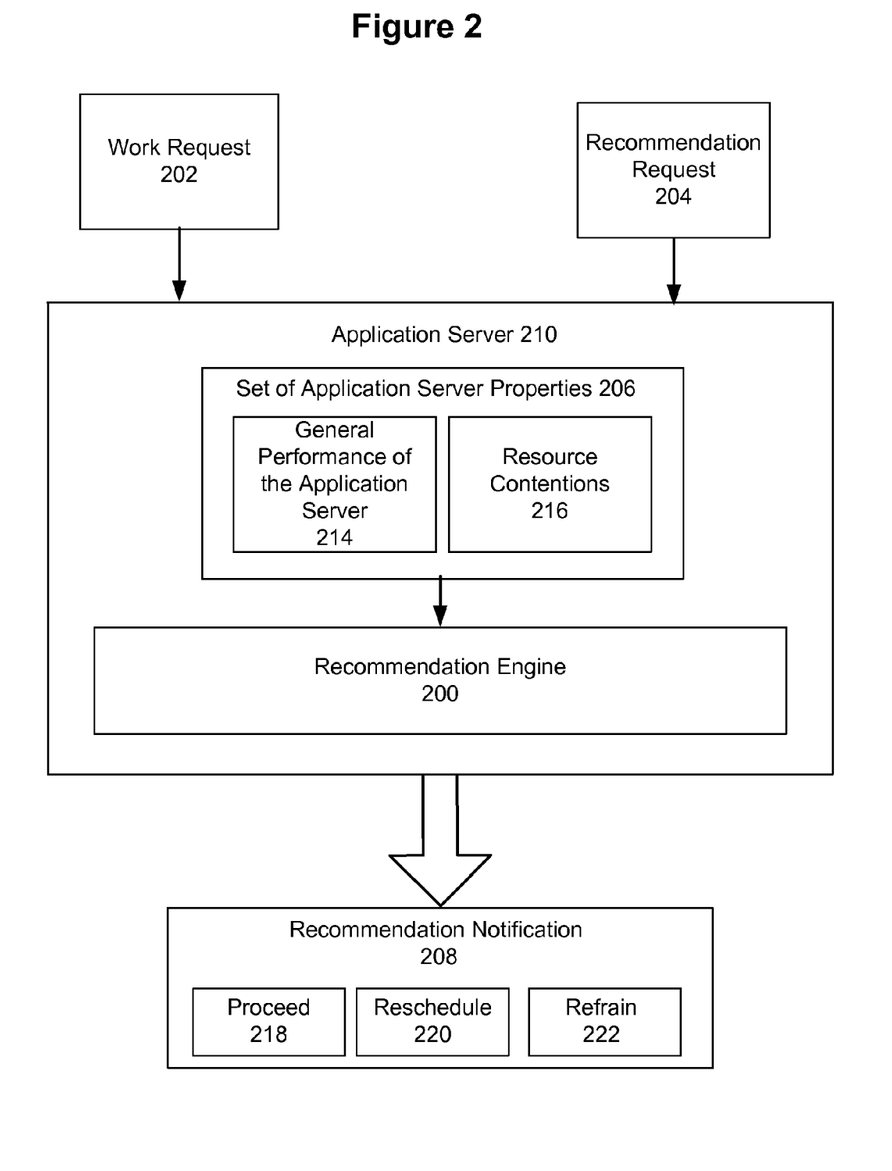
FIG. 2 shows an exemplary system for receiving advice before submitting a batch job for use in an application server or other environment, in accordance with an alternate embodiment of the invention.

FIG. 2 shows an exemplary system for receiving advice before submitting a batch job for use in an application server or other environment, in accordance with an alternate embodiment of the invention. As shown in FIG. 2, an application server 210 includes a recommendation engine 200 and a set of application server properties 206 that include information about the general performance of the application server 214, and any available resource contentions 216 with or associated with the application server as described herein.

As shown in FIG. 2, a work request 202 is received at the application server 210. The work request can be, e.g., a request to submit a batch job, or any other request for the application server to perform or facilitate work. The work request 202 can be received from a user in a number of different ways. For example, the user can submit the work request using a graphical user interface of an application (e.g., an Oracle Fusion ERP application that includes a user interface), where the graphical user interface can be an Enterprise Service Scheduler (ESS) jobs submission interface or other interface that allows for the submission of requests.

Referring again to FIG. 2, a recommendation request 204 is also received at the application server 210, and is thereafter communicated to the recommendation engine 200. The recommendation request is submitted by a user. The recommendation request 204 is a request for information on whether the application server can accept and process work request 202. The recommendation engine 200 uses the recommendation request 204 and the set of application server properties 206 to generate a recommendation notification 208. The recommendation notification 208 presents to a user the option to proceed 218 with scheduling the work request 202, the option to reschedule 220 the work request 202 at a later time, and/or the option to refrain 222 from scheduling the work request 202.

Thus, in accordance with an embodiment of the invention, when the application server is in an undesirable state and cannot process work request 202, the application server can provide a recommendation to a user to reschedule the work request 202 at a later time, or refrain from submitting new work requests until the application server recovers. This helps ensure that the application server does not deteriorate further if the user follows the recommendation. For example, in a traditional reactive system, if ten work requests are submitted, one is processed, and nine are deadlocked, the system will be placed under additional load when users unaware of the system deadlock continue to submit requests. The submission of additional requests worsens the state of the system. Thereafter, a system administrator will restore the system. However, in accordance with an embodiment of the invention the recommendation engine 200 provides the user with a recommendation notification 208 which alerts the user as to whether the work request 202 can be submitted at that time and/or should be scheduled for a later time, and thus, avoids further disrupting the system if the system is in an undesirable state and cannot process work requests. This proactive approach enhances system performance and also benefits usability. For example, by receiving the recommendation notification 208, the user is appraised of the system's ability to perform the work request and can take appropriate action.

Figure 3:
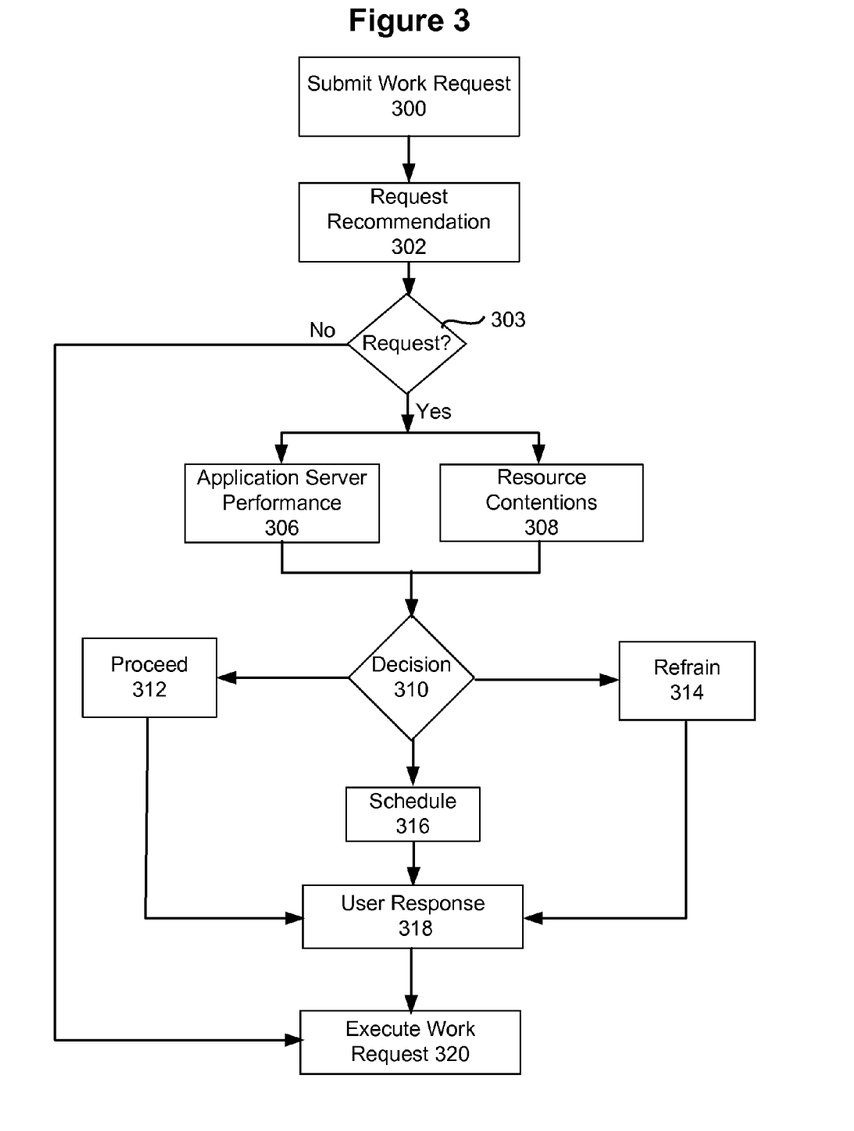
FIG. 3 shows a flowchart of a method in accordance with an embodiment of the invention, for receiving advice before submitting a batch job for use in an application server or other environment.

FIG. 3 shows a flowchart of a method in accordance with an embodiment of the invention, for receiving advice before submitting a batch job for use in an application server or other environment. As shown in FIG. 3, at step 300 an indication of a work request is received at a recommendation engine, where the work request can have a work request type associated therewith. For example, the work request can have a work request type of a Java batch job.

At step 302, a recommendation request is optionally received at the recommendation engine. The recommendation request can be requested by a user, e.g., by using a user action in a user interface such as a button, where when selected, the application server provides a recommendation notification to the user on whether to submit the work request. Alternatively, a recommendation notification can be automatically presented to the user when the user attempts to submit a work request. Additionally, when the application server goes into a state where it cannot take any further requests, it can provide the message to the user irrespective of the user's choice. At decision 303, if no recommendation request is received, the application server proceeds to step 320 to process the work request. If a recommendation request is received at decision 303, the method proceeds to execute steps performed by the recommendation engine.

At steps 306 and 308, a set of application server properties is received at the recommendation engine. The set of application server properties includes information about the general performance of the application server, and any available resource contentions. The general performance of the application server can be measured by the number of users waiting for a particular resource, database table, database object or other application server provided resource. For example, a greater number of users waiting for an application server provided resource (or resource associated with the application server) indicates that the application server is busy; and thus, application server performance will not be optimal. Additionally, the general performance of the application server can be measured by the number and/or state of work requests that are similar to the submitted work request, where the similarity of work requests can be based on the nature of the work requests, e.g., whether the work requests are for a java job or a report oriented job. Work requests of the same nature are more similar than work requests of a different nature, and the greater number of similar work requests indicates application server performance will not be optimal. Additionally, if there are similar work requests in a "stuck state" this is indicative that application server performance for this type of work request is not optimal. Information about the general performance of the application server can also include information about the load on the database or other loads on the application server. As batch jobs are processed, the application server executes the business functions associated with the batch jobs, and these business functions often require database access. When an excessive amount of batch jobs are being processed (and thus excessive business function calls to data stored in the database), the performance of the application server deteriorates, and the application server will not be able to process pending or submitted work requests optimally. The information associated with the general performance of the application server can be associated with a metric indicative of the general performance of the application server. This metric can be based on the combination of the above described factors, or any one of the factors such as the number of work requests similar to a work request type of the submitted work request.

Resource contentions in or associated with the application server can be measured by a number of deadlocks in the database or deadlocks associated with the application server. The information about resource contentions in or associated with the application server can be represented by a metric indicative of an availability of one or more resources of the application server and/or the database, or represented by a number of deadlocks in the database. In accordance with an embodiment of the invention, other information associated with the performance of the application server and associated systems can be used to determine whether the application server can optimally process the submission of additional work requests.

At step 310, based on the metric indicative of the application server's state, the metric indicative of a number of work requests similar to the request types that are pending, the metric indicative of a database's state, and any other information associated with the performance of the application server and associated systems, a recommendation on whether to submit the work request is determined by the recommendation engine. Additionally, a recommendation on whether to submit the work request can be determined by associating a weight with the metric indicative of the application server's state, with the metric indicative of a number of work requests similar to the request types that are pending, and with the metric indicative of a database's state. The metric indicative of the application server's state, the metric indicative of a number of work requests similar to the request types that are pending, and the metric indicative of a database's state and associated weight can then be combined to compute an application server performance score. Based on the application server performance score, the recommendation on whether to submit the work request can be determined. For example, the application server performance score can be compared to a threshold performance score, and based on the comparison, the recommendation on whether to submit the work request can be determined.

A recommendation notification is generated and presented to a user based on the recommendation. For example, at step 312, a recommendation notification is generated that indicates to a user to proceed with submitting the work request. At step 314 a recommendation notification is generated that indicates to the user to refrain from submitting the work request, and at step 316, a recommendation notification is generated that indicates to the user to schedule a time to submit the work request. When the recommendation notification indicates to the user to refrain from submitting the work request, the recommendation notification can present options on how the user would like to be notified when the application server is able to accept the work request. For example, the application server can send a notification to the user by email, text message, or any another messaging/notification process to indicates that the application server is available to process the user's work request and for the user to resubmit the work request.

At step 318, the user receives the recommendation notification (proceed 312, schedule 316, refrain 314) and responds to the recommendation notification. The user responds to the. For example, the user can act in accordance with the recommendation i.e. to proceed with, schedule or refrain from proceeding with the work request. In some cases the user can also be given the option to act contrary to the recommendation. In accordance with an embodiment of the invention, the recommendation notification can include other information associated with the application server and related systems. For example, if the recommendation engine determines that the work request cannot be submitted based on the recommendation, the recommendation engine can generate a recommendation notification that includes application server state information that can be used to debug the application server or other related systems. Depending on the user response at step 318, the work request 300 is processed at step 320 (for example, immediately, after a scheduled delay, or not at all).

Figure 4:
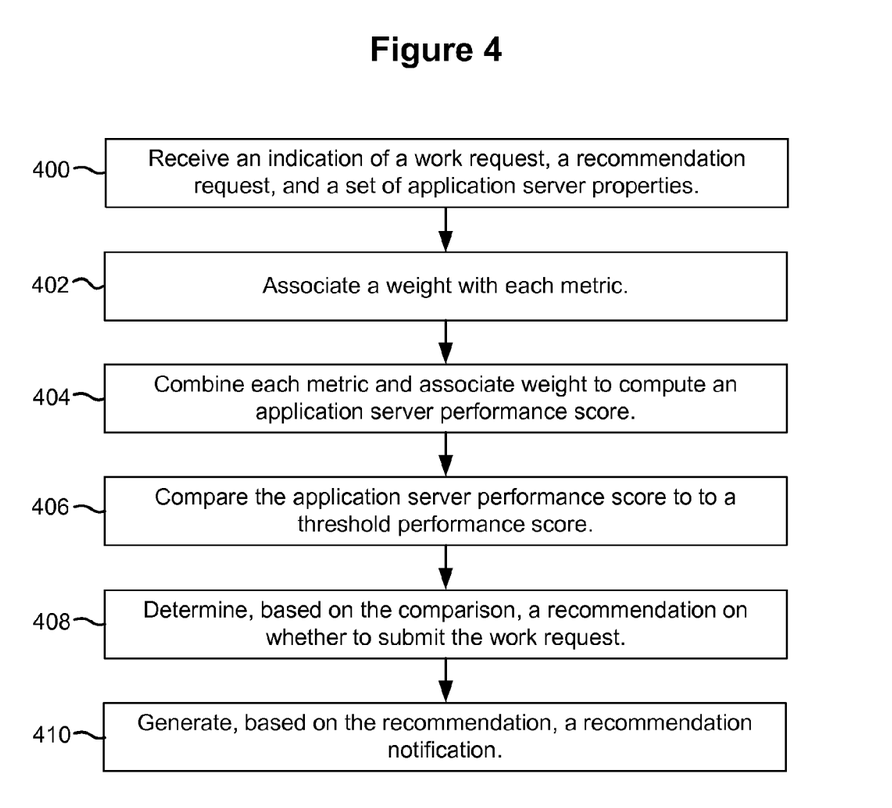
FIG. 4 shows a flowchart of a method in accordance with an alternate embodiment of the invention, for receiving advice before submitting a batch job for use in an application server or other environment.

FIG. 4 shows a flowchart of a method in accordance with an alternate embodiment of the invention, for receiving advice before submitting a batch job for use in an application server or other environment. As shown in FIG. 4, at step 400, an indication of a work request, a recommendation request, and a set of application server properties are received at a recommendation engine. The set of application server properties includes information about the general performance of the application server, and any available resource contentions. As described above, the general performance of the application server can be represented by a metric indicative of the general performance of the application server, and resource contentions in or associated with the application server can be represented by a metric indicative of an availability of one or more resources of the application server and/or the database, and a number of deadlocks in the database.

At step 402 a weight is associated with the metric indicative of the application server's state, with the metric indicative of a number of work requests similar to the request types that are pending, and with the metric indicative of a database's state. At step 404, the metric indicative of the application server's state, the metric indicative of a number of work requests similar to the request types that are pending, and the metric indicative of a database's state and associated weights are then combined to compute an application server performance score. At step 406, the application server performance score is compared to a threshold performance score, and at step 408, based on the comparison, a recommendation on whether to submit the work request is determined.

At step 410, a recommendation notification is generated and presented to a user based on the recommendation. The recommendation notification can indicate to a user to proceed with submitting the work request, to refrain from submitting the work request, or to schedule a time to submit the work request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method in an associated application server for providing a recommendation to an associated user before selectively submitting a work request, the method comprising:
    receiving at a recommendation engine operable by the associated application server and executing on one or more microprocessors, an indication of a work request for the work request to be selectively submitted by the associated user;
    receiving at the recommendation engine a request for a recommendation associated with the indication of the work request;
    receiving a set of application server properties at the recommendation engine;
    processing the request for the recommendation to determine a work request type associated with the indication of the work request, and to determine an application server performance score by combining a metric indicative of a number of pending work requests that have a similar work request type as the work request type associated with the indication of the work request based on a nature of the work request to be selectively submitted by the associated user, a metric indicative of a state of the associated application server, and a metric indicative of a state of a database;
    determining, based on the application server performance score, the recommendation associated with the indication of the work request; and
    based on the recommendation, selectively generating a recommendation notification that indicates an ability of the associated application server to perform the work request.

2. The method of claim 1, wherein:
    the receiving the indication of the work request comprises receiving an indication of a work request for a batch job at the recommendation engine.

3. The method of claim 1, wherein the generating the recommendation request comprises:
    generating a recommendation notification that indicates options to the associated user comprising one of: proceeding with submitting the work request, scheduling a time to submit the work request, and refraining from submitting the work request, wherein the recommendation notification provides for a proactive approach to submitting the work request.

4. The method of claim 1, further comprising:
    determining that the work request cannot be submitted based on the recommendation;
    generating a recommendation notification that indicates one of scheduling a time to submit the work request and refraining from submitting the work request; and
    wherein the recommendation notification comprises application server state information used to debug the application server, and wherein the recommendation notification provides for a proactive approach to submitting the work request.

5. The method of claim 1, further comprising
    associating a weight to the metric indicative of the application server's state, a weight to the metric indicative of the number of pending work requests that have a similar work request type as the request type associated with the indication of the work request, and a weight to the metric indicative of the database's state; and
    combining the weight of the metric indicative of the state of the associated application server, the weight of the metric indicative of the number of work requests that have a similar work request type as the request type associated with the indication of the work request that are pending, and the weight of the metric indicative of the state and associated weights of the database to compute the application server performance score.

6. The method of claim 5, further comprising:
    comparing the application server performance score to a threshold performance score; and
    determining, based on the comparison, the recommendation associated with the indication of the work request.

7. A system for providing a recommendation to an associated user before the associated user selectively submits a work request, the system comprising:
    an application server comprising a recommendation engine, wherein the recommendation engine executes on one or more microprocessor, and wherein the application server is adapted to receive at the recommendation engine an indication of a work request for the work request to be selectively submitted by the associated user;
    wherein the recommendation engine of the application server is adapted to:
        receive a request for a recommendation associated with the indication of the work request,
        receive a set of application server properties,
        process the request for the recommendation to determine a work request type associated with the indication of the work request, and to determine an application server performance score by combining a metric indicative of a number of pending work requests that have a similar work request type as the work request type associated with the indication of the work request based on a nature of the work request to be selectively submitted by the associated user, a metric indicative of a state of the associated application server, and a metric indicative of a state of a database;

determine, based on the application server performance score, the recommendation associated with the indication of the work request; and based on the recommendation, selectively generate a recommendation notification that indicates an ability of the associated application server to perform the work request.

8. The system of claim 7, wherein the receiving the indication of the work request comprises receiving an indication of a work request for a batch job.

9. The system of claim 7, wherein the recommendation notification indicates options to the associated user comprising one of: proceeding with submitting the work request, scheduling a time to submit the work request, and refraining from submitting the work request, and, wherein the recommendation notification provides for a proactive approach to submitting the work request.

10. The system of claim 7, wherein when the recommendation engine determines that the work request cannot be submitted based on the recommendation, the recommendation engine:

generates a recommendation notification that indicates one of scheduling a time to submit the work request and refraining from submitting the work request; and wherein the recommendation notification comprises application server state information used to debug the application server, and wherein the recommendation notification provides for a proactive approach to submitting the work request.

11. The system of claim 7, wherein the recommendation engine is adapted to:

associate a weight to the metric indicative of the application server's state, a weight to the metric indicative of the number of pending work requests having a similar work request type as to the work request type associated with the indication of the work request, and a weight to the metric indicative of the database's state; and combine the weight of the metric indicative of the associated application server, the weight of the metric indicative of the number of work requests having the work request type similar to the work request type associated with the indication of the work request, and the weight of the metric indicative of the state of the database to compute the application server performance score.

12. The system of claim 11, wherein the recommendation engine is further adapted to:

compare the application server performance score to a threshold performance score; and determine, based on the comparison, the recommendation associated with the indication of the work request.

13. A non-transitory computer readable storable medium storing one or more sequences of instructions for providing a recommendation to an associated user before selectively submitting a work request, wherein said instructions, when executed by one or more processors of an associated application server, cause the one or more processors to execute steps of:

receiving at a recommendation engine operable by the associated application server an indication of a work request for the work request to be selectively submitted by the associated user;

receiving at the recommendation engine a request for a recommendation on whether to submit the work request;

receiving a set of application server properties at the recommendation engine;

processing the request for the recommendation to determine a work request type associated with the indication of the work request, and to determine an application server performance score by combining a metric indicative of a number of pending work requests that have a similar work request type as the work request type associated with the indication of the work request based on a nature of the work request to be selectively submitted by the associated user, a metric indicative of a state of the associated application server, and a metric indicative of a state of a database;

determining, based on the application server performance score, the recommendation on whether to submit the work request; and based on the recommendation, selectively generating a recommendation notification that indicates an ability of the associated application server to perform the work request.

14. The non-transitory computer readable storable medium of claim 13, further wherein the generating the recommendation request comprises:

generating a recommendation notification that indicates options to the associated user comprising one of: proceeding with submitting the work request, scheduling a time to submit the work request, and refraining from submitting the work request, wherein the recommendation notification provides for a proactive approach to submitting the work request.

15. The non-transitory computer readable storable medium of claim 13, further comprising:

determining that the work request cannot be submitted based on the recommendation;

generating a recommendation notification that indicates one of scheduling a time to submit the work request and refraining from submitting the work request; and wherein the recommendation notification comprises application server state information used to debug the application server, and wherein the recommendation notification provides for a proactive approach to submitting the work request.

16. The non-transitory computer readable storable medium of claim 13, further comprising associating a weight to the metric indicative of the application server's state, a weight to the metric indicative of the number of pending work requests having a similar work request type as the work request type associated with the indication of the work request, and a weight to the metric indicative of a database's state; and combining the weight of the metric indicative of the state of the associated application server, the weight of the metric indicative of the number of pending work requests having a similar work request type as the work request type associated with the indication of the work request, and the weight of the metric indicative of the state of the database to compute the application server performance score.

17. The non-transitory computer readable storable medium of claim 16, further comprising:

comparing the application server performance score to a threshold performance score; and determining, based on the comparison, the recommendation on whether to submit the work request.

* * * * *